United States Patent [19]

Hose

[11] 4,149,168
[45] Apr. 10, 1979

[54] SEQUENTIALLY BALANCED MODULATION TONE RANGING SYSTEM AND METHOD

[75] Inventor: Eddy Hose, Del Mar, Calif.
[73] Assignee: Cubic Corporation, San Diego, Calif.
[21] Appl. No.: 855,924
[22] Filed: Nov. 30, 1977
[51] Int. Cl.² ............................................. G01S 3/02
[52] U.S. Cl. ........................... 343/112 D; 343/105 R
[58] Field of Search ........... 343/112 D, 105 R, 105 H

[56] References Cited

U.S. PATENT DOCUMENTS

| | | | |
|---|---|---|---|
| 3,340,533 | 9/1967 | Earp | 343/105 R |
| 3,928,852 | 12/1975 | Barker | 343/105 R |

OTHER PUBLICATIONS

Rupp, Jr., "Experimental Omega Four Freq. Format Extends Lane Ambiguity", Nov. 1974, pp. 21–29, Proceedings of the 2nd Omega Symp., The Institute of Nav., Wash., D.C.
Nard, "State of Experimentation & Program of Dev. of Differential Omega in France", Nov. 1974, pp. 96–107h, Proceedings of the 2nd Omega Symp., The Institute of Nav., Wash., D.C.

Primary Examiner—Theodore M. Blum
Attorney, Agent, or Firm—Brown & Martin

[57] ABSTRACT

A carrier signal of a first frequency is mixed with a tone signal of a second frequency to produce an upper sideband signal at a frequency equal to the sum of the first and second frequencies and to produce a lower sideband signal at a frequency equal to the difference of the upper and lower frequencies. The upper and lower sideband signals are provided separately and sequentially to produce a sequentially balanced modulation tone ranging signal for transmission. The received sequentially balanced modulation tone ranging signal is processed to produce a measurement signal containing the phase information of the received signal at a measurement frequency. A local signal is provided at the measurement frequency. The phase of the measurement signal is subtracted from the phase of the local signal to produce a phase shift information signal for sequentially indicating the phase shift in the upper and lower sidebands of the received signal. When it is desired to transmit data in addition to the ranging tone, the carrier signal and/or the tone signal is modulated by a data signal prior to mixing the carrier signal with the tone signal.

20 Claims, 4 Drawing Figures

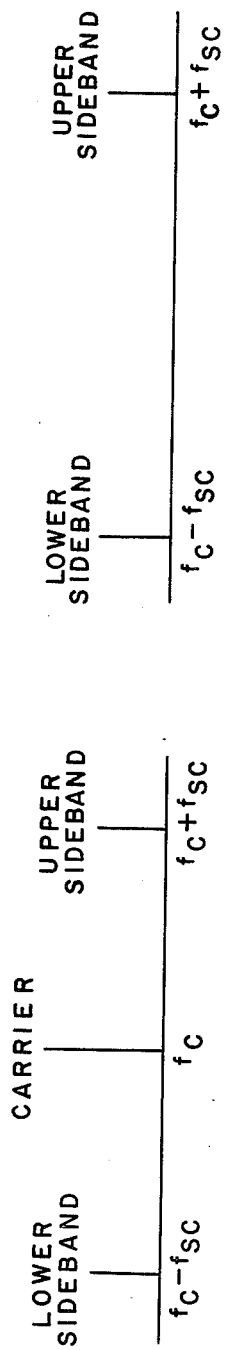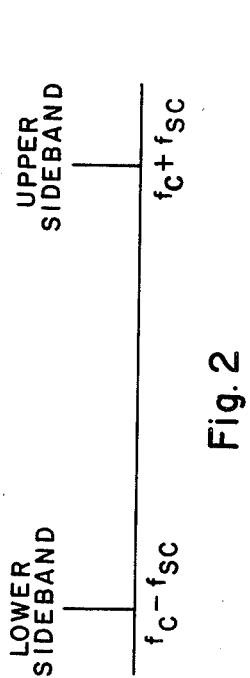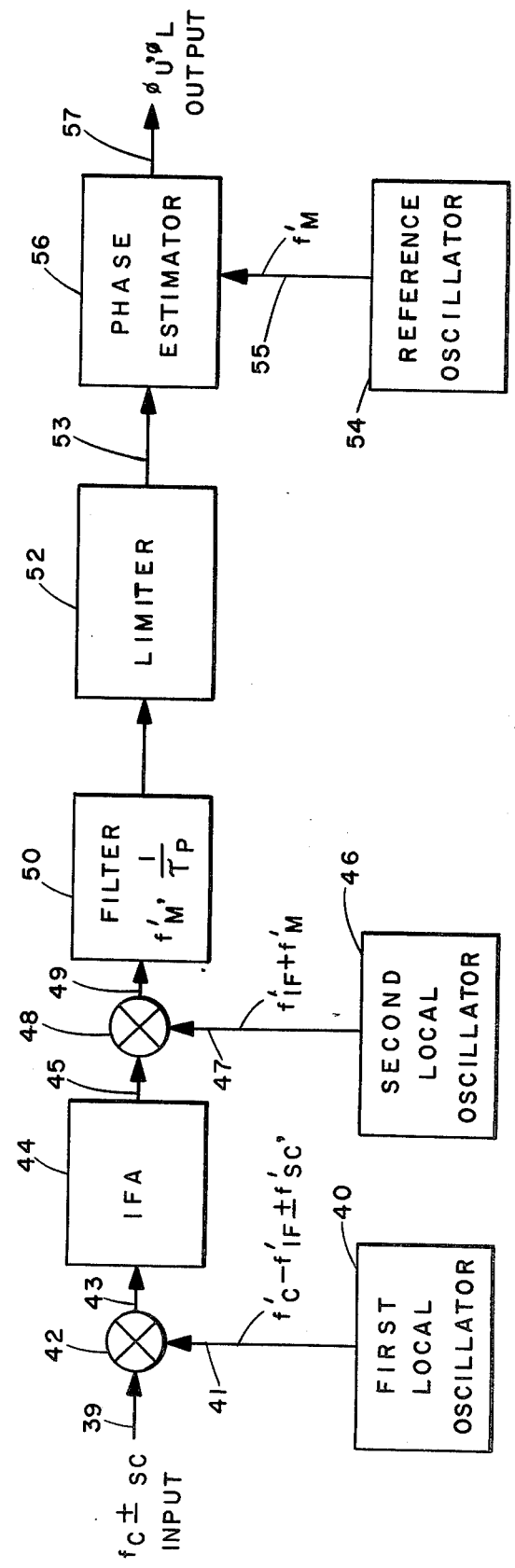

SEQUENTIALLY BALANCED MODULATION TONE RANGING SYSTEM AND METHOD

BACKGROUND OF THE INVENTION

The present invention generally pertains to systems and methods for modulating and demodulating ranging signals and is particularly directed to processing a modulation tone ranging signal that can be transmitted over a narrow bandwidth and simultaneously carry data.

Modulation tone ranging signals are produced by distance measurement equipment for measuring distance. Distance is determined by measuring the phase displacement of a tone signal that is transmitted over the distance to be measured. However, the tone signal frequencies that are most useful for making phase displacement measurements are much lower than those frequencies which are made available by regulatory agencies for distance measurement equipment communications. Also, useful tone signal frequencies might not have the desired electrical or electromagnetic propogation characteristics. Accordingly, a carrier signal having a frequency in the available frequency band is modulated by a tone signal having a frequency that is preferred for phase displacement measurement.

A tone ranging signal is produced for transmission in typical prior art tone ranging systems by frequency modulating (FM) or phase modulating the carrier signal with the tone signal. A significantly large bandwidth is required for both FM tone ranging signals and PM tone ranging signals. Amplitude modulation also has been considered for tone ranging signals, whereby the tone signal is mixed with the carrier signal. FIG. 1 generally depicts the frequency spectrum of the signals produced by mixing the one signal and the carrier signal. The carrier signal has a first frequency $f_c$. The tone signal has a second frequency $f_{sc}$. By mixing the tone and carrier frequencies, upper and lower sideband signals are produced at frequencies $f_c + f_{sc}$ and $f_c - f_{sc}$ respectively. Since the useful information is provided by the tone signals, the carrier can be suppressed and the transmitted signal can be a suppressed carrier AM sideband signal, the frequency spectrum of which is shown in FIG. 2.

Suppressed carrier AM would provide a very efficient tone ranging signal transmission method and system because it would concentrate the energy into the two sidebands, and the signal could be transmitted over a much more narrow frequency bandwidth than conventional tone ranging signals that use frequency or phase modulation. However, suppressed carrier AM would not be satisfactory for tone ranging systems because suppressed carrier AM signals would be too sensitive to phase drifts in the IF amplifier of the AM receiver. The intermediate frequency channel used for demodulating the received suppressed carrier AM signal would have to be wide enough to include both the upper and lower sideband frequencies, and the phase drift at one of the band typically would differ from the phase drift at the other end of the band. Although two different IF or measurement frequency channels could, and typically would, be used for the upper and lower sidebands, there still would be different phase drifts in the different IF or measurement frequency channels.

SUMMARY OF THE INVENTION

The present invention provides a sequentially balanced modulation tone ranging system and method.

In accordance with the present invention a carrier signal of a first frequency is mixed with a tone signal of a second frequency to produce an upper sideband signal at a frequency equal to the sum of the first and second frequencies and to produce a lower sideband signal at a frequency equal to the difference of the upper and lower frequencies. The upper and lower sideband signals are provided separately and sequentially to produce a sequentially balanced modulation tone ranging signal for transmission.

Upon receipt, the sequentially balanced modulation tone ranging signal is demodulated to produce a phase shift information signal. According to the present invention the received sequentially balanced modulation tone ranging signal is processed to produce a measurement signal containing the phase information of the received signal at a measurement frequency. A local signal is provided at the measurement frequency. The phase of the measurement signal is subtracted from the phase of the local signal to produce a phase shift information signal for sequentially indicating the phase shift in the upper and lower sidebands of the received signal.

In the preferred embodiment the received sequentially balanced modulation tone ranging signal is processed as follows: A first local signal is provided at a frequency equal to the difference of an intermediate frequency from the first (carrier) frequency plus or minus the second (tone) frequency with the first and second frequencies being alternately added and subtracted in sequential synchronization with the upper and lower sideband signals respectively. The received signal is heterodyned with the first local signal to produce an intermediate frequency received signal. A second local signal is provided at a frequency equal to the sum of the intermediate frequency plus a measurement frequency. The intermediate frequency received signal is heterodyned with the second local signal to produce a received measurement signal. A third local signal is provided at the measurement frequency; and the phase of the received measurement signal is subtracted from the phase of the third local signal to produce a phase shift information signal for sequentially indicating the phase shift in the upper and lower sidebands of the received signal.

The sequentially balanced modulation tone ranging signal may be transmitted over a much more narrow bandwidth than conventional tone ranging signals that use frequency or phase modulation.

The sequentially balanced modulation tone ranging signal provides an energy efficiency that is comparable to that of a suppressed carrier AM sideband signal; and yet it is not sensitive to phase drift in the IF amplifier of the receiver. A relatively narrow band IF channel can be used in demodulating the sequentially balanced modulation tone ranging signal by mixing the received sequentially balanced modulation tone ranging signal with a local signal having a frequency equal to the difference of an intermediate frequency from the first (carrier) frequency plus or minus the second (tone) frequency with the first and second frequencies being alternately added and subtracted in sequential synchronization with the upper and lower sideband signals respectively. Accordingly the phase information in both the upper and lower sidebands of the received sequentially balanced modulation tone ranging signal is carried at the center of the IF channel and is not sensitive to differing phase drifts at the extremes of the IF band in the IF amplifier, as would be a single receiver for receiving a suppressed carrier AM signal. Also a more complex system would be required for demodulating a suppressed carrier AM signal.

Also the sequentially balanced modulation tone ranging signal is particularly useful in jam resistant systems utilizing frequency hopping, techniques wherein the carrier frequency is hopped from one carrier frequency to another in accordance with a predetermined hopping sequence code.

In addition a sequentially balanced modulation tone ranging signal also can be modulated for transmitting data over the same communication channel as the tone signal. This is particularly advantageous since many distance measurement equipment systems also require a data link capability.

In accordance with the present invention, the sequentially balanced modulation tone signal is modulated to carry data by phase modulating the carrier signal with a first data signal prior to mixing the carrier signal with the tone signal, and/or phase modulating the tone signal with a second data signal prior to mixing the carrier signal with the tone signal.

BRIEF DESCRIPTION OF THE DRAWING

FIG. 1 is a frequency spectrum of signals produced by mixing a carrier signal with a tone signal.

FIG. 2 is a frequency spectrum of a suppressed carrier AM signal.

FIG. 4 is a schematic block diagram of a system for producing phase shift information signals from a received sequentially balanced modulation tone ranging signal.

DESCRIPTION OF THE PREFERRED EMBODIMENT

Figure 3:
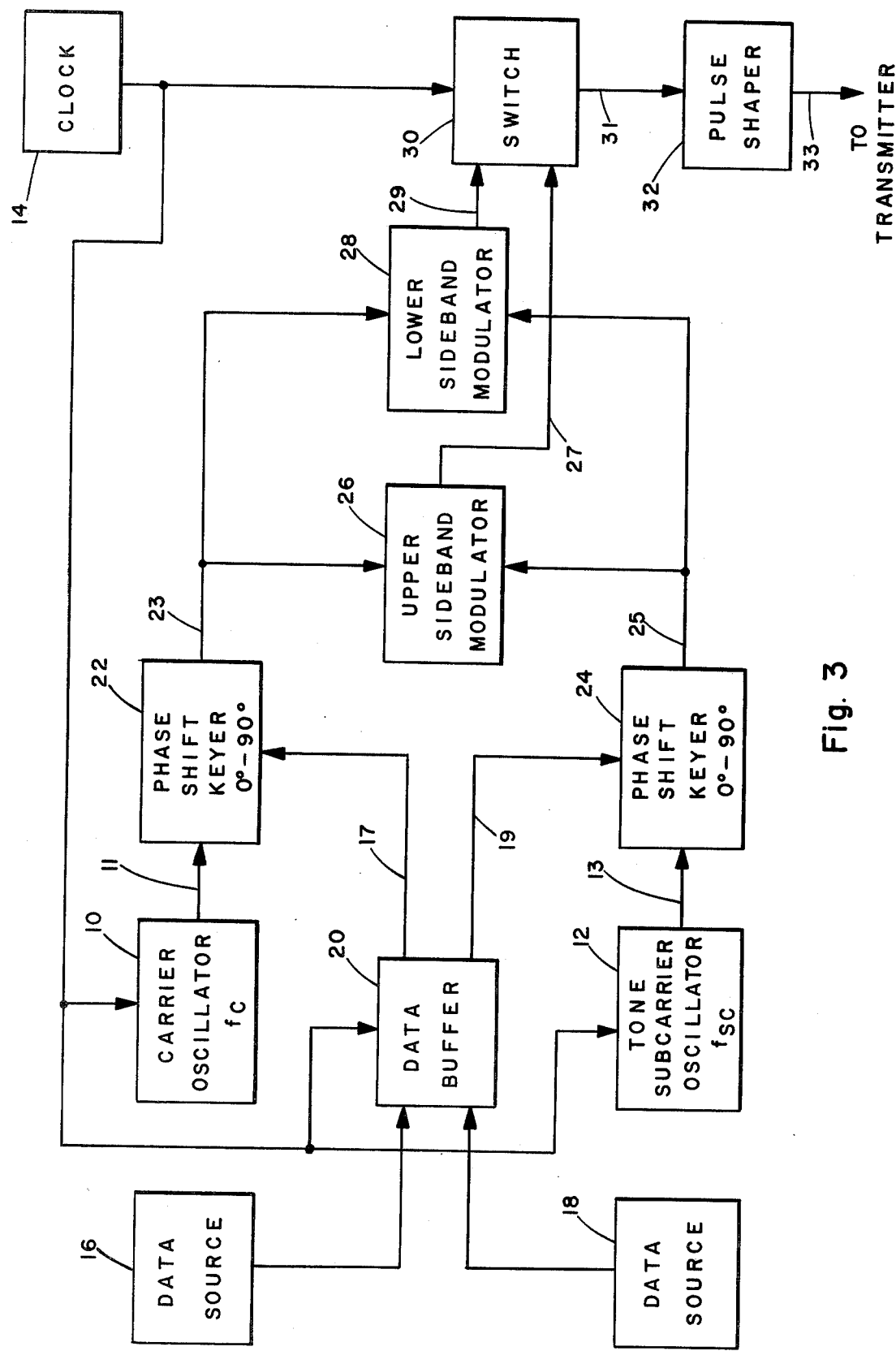
FIG. 3 is a schematic block diagram of a system for producing a sequentially balanced modulation tone ranging signal in accordance with the present invention.

Referring to FIG. 1, a preferred embodiment of a system for producing a sequentially balanced modulation tone ranging signal includes a carrier oscillator 10, a tone subcarrier oscillator 12, a clock 14, a first data source 16, a second data source 18, a data buffer 20, a first phase shift keyer 22, a second phase shift keyer 24, an upper sideband modulator 26, a lower sideband modulator 28, a switch 30 and a pulse shaper 32. The carrier oscillator 10 and the tone subcarrier oscillator 12 are both controlled by a clock 14.

The carrier oscillator 10 provides a continuous wave carrier signal of a first frequency $f_c$ on line 11. The tone subcarrier oscillator 12 provides a pulsed tone signal of a second frequency $f_{sc}$ on line 13.

The first data source 16 provides a first digital data signal. The second data source 18 provides a second digital data signal. The digital data signals from the first and second data sources are provided to the data buffer 20, which is clocked by the clock 14 to provide the first and second data signals on lines 17 and 19 respectively in synchronism with the carrier signal and tone signal that are provided on lines 11 and 13 respectively.

The first phase shift keyer 22 phase modulates the carrier signal on line 11 with the first digital data signal on line 17. The second phase shift keyer 24 phase modulates the tone signal on line 13 with the second digital data signal on line 19. The phase shift keyers 22, 24 phase modulate the carrier signal and tone signal by shifting their respective phase either 0° or 90° in accordance with the binary state of the respective digital data signals.

The upper sideband modulator 26 mixes the phase modulated carrier signal on line 23 with the phase modulated tone signal on line 25 to produce an upper sideband signal on line 27 at a frequency equal to $f_c + f_{sc}$. The lower sideband modulator 28 mixes the phase modulated carrier signal on line 23 with the phase modulated tone signal on line 25 to produce a lower sideband signal on line 29 at a frequency equal to $f_c - f_{sc}$. The switch 30 is controlled by the clock 14 for separately and sequentially providing the upper and lower sideband signals onto line 31 from lines 27 and 29 respectively to produce a sequentially balanced modulation tone ranging signal for transmission. The signal on line 31 is further shaped by the pulse shaper 32 before it is provided on line 33 to a transmitter.

The system of FIG. 3 is useful for providing a sequentially balanced modulation tone ranging signal whether or not data is provided from the data sources 14, 16. When no data signal is provided on either line 17 or line 19, the respective carrier signal on line 11 and tone signal on line 13 are mixed with each other without first being phase modulated by a data signal, since the phase shift keyers 22, 24 will pass the carrier signal on line 11 and the tone signal on line 13 onto lines 23 and 25 respectively without shifting their respective phases. When data from only one data source 16, 18, is to be transmitted with the modulation tone, it is preferable that the tone signal on line 13 be modulated by a digital data signal on line 19 and that an unmodulated carrier signal be provided on line 23 to the upper sideband modulator 26 and the lower sideband modulator 28.

Referring to FIG. 4, a preferred embodiment of a system for producing a phase shift information signal from a received sequentially balanced modulation tone ranging signal includes a first local oscillator 40, a first mixer 42, an intermediate frequency amplifier 44, a second local oscillator 46, a second mixer 48, a filter circuit 50, a limiter 52, a reference oscillator 54, and a phase estimator circuit 56. A sequentially balanced modulation tone ranging signal having a frequency $f_c \pm f_{sc}$ is received on input line 39.

The first local oscillator 40 provides a first local signal on line 41 at a frequency equal to the difference of an intermediate frequency $f'_{IF}$ from the carrier signal frequency $f'_c$ plus or minus the tone signal frequency $f'_{sc}$ with the frequencies $f'_c$ and $f'_{sc}$ being added and subtracted in sequential synchronization with the upper and lower sideband signals as provided on line 31 in the system of FIG. 3, respectively. The first mixer 42 heterodynes the received signal on line 39 with the first local signal on line 41 to produce and intermediate frequency received signal on line 43, which is in turn amplified by the IF amplifier 44.

The second local oscillator 46 provides a second local signal at a frequency equal to the sum of the intermediate frequency $f'_{IF}$ plus a measurement frequency $f'_M$. The second mixer 48 heterodynes the amplified intermediate frequency received signal on line 45 with the second local signal on line 47 to produce a received measurement signal having a frequency $f'_M$ on line 49. The received measurement signal on line 49 is further processed by a filter circuit 50 and an amplitude limiter 52. The filter circuit 50 passes pulsed signals having the frequency $f'_M$ and a pulse width of $\tau_p$. $\tau_p$ is the period of the pulse of the tone signal provided on line 13 in the system of FIG. 3.

The reference oscillator 54 provides a third local signal at the measurement frequency $f'_M$. The phase estimator circuit 56 subtracts the phase of the filtered and limited received measurement signal on line 53 from the phase of the third local signal on line 55 to produce a phase shift information signal on line 57. The phase shift information signal on line 57 sequentially indicates the phase shift $\phi_U$ in the upper sideband of the signal received on line 39 and the phase shift $\phi_L$ in the lower sideband of the received signal.

The expressions for the measurement signal waveforms on line 53 at the output of the limiter 52 are given by the following equations:

$$\phi_U(t) = [\sin \omega' - _M t + (\omega_C - \omega'_C)t + (\omega_{SC} - \omega'_{SC})t - (\omega_C + \omega_{SC})\tau_d + \phi_C + \phi_{SC}] \quad (1)$$

$$\phi_L(t) = [\sin\omega'_M(t + \tau_p) + (\omega_C - \omega'_C)(t + \tau_p) - (\omega_{SC} - \omega'_{SC})(t + \tau_p) - (\omega_C - \omega'_{SC})\tau_d] \quad (2)$$

$\tau_d$ is the propagation delay.

$\phi_c$ represents data modulated on the carrier signal.

$\phi_{sc}$ represents data modulated on the tone signal.

The phase estimator circuit 56 subtracts the phase of the measurement signal on line 53 from the phase of the local signal on line 55, thus removing the terms in Equations (1) and (2) which are associated with $\omega'_M$. The remaining terms are only those which are associated with the local and received carrier signals and tone signals. The upper and lower sideband phases contain nearly the same terms. The carrier-related terms appear at the same sign, while the tone-related terms are of opposite signs. Therefore, summing and differencing the lower and upper sideband output signals on line 57 from the phase estimator circuit 56 results in separation of the carrier and tone subcarrier terms. This is shown in the following equations:

$$\text{SUM} = 2(\omega_C - \omega'_C)(t + \tau_p/2) - 2\omega_C \tau_d + 2\phi_c - (\omega_{SC} - \omega'_{SC})\tau_p \quad (3)$$

$$\text{DIFF} = 2(\omega_{SC} - \omega'_{SC})(t + \tau_p/2) 2\omega_{SC}\tau_d + 2\phi_{sc} - (\omega_C - \omega'_C)\tau_p \quad (4)$$

Neglecting the cross coupling terms, the sum of the phases, as given by Equation (3), contains three terms which are related to the carrier phase and the difference phase in Equation (4) contains three terms which are related to the tone phase. The first term represents the frequency drift between the received and local clocks and can be made negligibly small. The second term represents the phase shift between the received and local clock, which is proportional to the synchronization error. The third term represents the data phase shift keying and needs to be separated from the range phase shifts.

To remove the data phase shift keying prior to estimating the synchronization error, the data is coded into PN (pseudo random noise) sequences which represent M-ary symbols. The sum and difference phases measurements are fed to a function generator, where their cosine and sine functions are derived. Thus, the phase measurements are transformed into phasors with unity amplitude. The quadrature terms of the phasors are stored in a buffer and, when a complete symbol is assembled, are fed into correlators, where they are convolved with reference symbols. The outputs of the correlators are squared, and the quadrature terms are summed and fed into a comparator. The maximum signal is determined to represent the transmitted symbol. The amplitude of this signal is fed to an address detection circuit, where it is compared with a threshold. The quadrature components of the detected symbol are then used to derive the average phase of the tone or carrier, by taking the arc tangent of their ratio. Thus, addressing, ranging, and data are derived from the same set of phase measurements.

I claim:

1. A ranging system, comprising
   a first system for producing a modulation tone ranging signal for transmission comprising
   means for providing a carrier signal of a first frequency;
   means for providing a tone signal of a second frequency;
   means for mixing the carrier signal with the tone signal to produce an upper sideband signal at a frequency equal to the sum of the first and second frequencies and to produce a lower sideband signal at a frequency equal to the difference of the first and second frequencies; and
   means for separately and sequentially providing the upper and lower sideband signals to produce a sequentially balanced modulation tone ranging signal for transmission; and
   a second system for producing a phase shift information signal from a received said sequentially balanced modulation tone ranging signal, comprising
   means for processing the received signal to produce a measurement signal containing the phase information of the received signal at a measurement frequency;
   means for providing a local signal at the measurement frequency; and
   means for subtracting the phase of the measurement signal from the phase of the local signal to produce a phase shift information signal for sequentially indicating the phase shift in the upper and lower sidebands of the received signal.

2. A system according to claim 1, further comprising means for providing a data signal; and
   means for phase modulating the carrier signal with the data signal prior to mixing the carrier signal with the tone signal.

3. A system according to claim 1, further comprising means for providing a data signal; and
   means for phase modulating the tone signal with the data signal prior to mixing the carrier signal with the tone signal 4. A system according to claim 1, further comprising means for providing a first data signal;
   means for providing a second data signal;
   means for phase modulating the carrier signal with the first data signal prior to mixing the carrier signal with the tone signal; and
   means for phase modulating the tone signal with the second data signal prior to mixing the carrier signal with the tone signal.

5. A ranging system, comprising
   a first system for producing a modulation tone ranging signal for transmission, comprising
   means for providing a carrier signal of a first frequency
   means for providing a tone signal of a second frequency
   means for mixing the carrier signal with the tone signal to produce an upper sideband signal at a frequency equal to the sum of the first and second frequencies and to produce a lower sideband signal at a frequency equal to the difference of the first and second frequencies; and means for separately and sequentially providing the upper and lower sideband signals to produce a sequentially balanced modulation tone ranging signal for transmission; and a second system for producing a phase shift information signal from a received said sequentially balanced modulation tone ranging signal, comprising means for providing a first local signal at a frequency equal to the difference of an intermediate frequency from the first frequency plus or minus the second frequency with the first and second frequencies being alternately added and subtracted in sequential synchronization with the upper and lower sideband signals respectively;

means for heterodyning the received signal with the first local signal to produce an intermediate frequency received signal;

means for providing a second local signal at a frequency equal to the sum of the intermediate frequency plus a measurement frequency;

means for heterodyning the intermediate frequency received signal with the second local signal to produce a received measurement signal;

means for providing a third local signal at the measurement frequency; and means for subtracting the phase of the received measurement signal from the phase of the third local signal to produce a phase shift information signal for sequentially indicating the phase shift in the upper and lower sidebands of the received signal.

6. A system according to claim 5, further comprising means for providing a data signal; and means for phase modulating the carrier signal with the data signal prior to mixing the carrier signal with the tone signal.

7. A system according to claim 5, further comprising means for providing a data signal; and means for phase modulating the tone signal with the data signal prior to mixing the carrier signal with the tone signal.

8. A system according to claim 5, further comprising means for providing a first data signal;

means for providing a second data signal;

means for phase modulating the carrier signal with the first data signal prior to mixing the carrier signal with the tone signal; and means for phase modulating the tone signal with the second data signal prior to mixing the carrier signal with the tone signal.

9. A system for producing phase shift information signal from a received sequentially balanced modulation tone ranging signal that contains sequentially separated upper and lower sideband signals produced by mixing a carrier signal of a first frequency with a tone signal of a second frequency, wherein the upper sideband signal has a frequency equal to the sum of the first and second frequencies, and the lower sideband signal has a frequency equal to the difference of the first and second frequencies, the system comprising means for providing a first local signal at a frequency equal to the difference of an intermediate frequency from the first frequency plus or minus the second frequency with the first and second frequencies being alternately added and subtracted in sequential synchronization with the upper and lower sideband signals respectively;

means for heterodyning the received signal with the first local signal to produce an intermediate frequency received signal;

means for providing a second local signal at a frequency equal to the sum of the intermediate frequency plus a measurement frequency;

means for heterodyning the intermediate frequency received signal with the second local signal to produce a received measurement signal;

means for providing a third local signal at the measurement frequency; and means for subtracting the phase of the received measurement signal from the phase of the third local signal to produce a phase shift information signal for sequentially indicating the phase shift in the upper and lower sidebands of the received signal.

10. A system for producing a phase shift information signal from a received sequentially balanced modulation tone ranging signal that contains sequentially separated upper and lower sideband signals produced by mixing a carrier signal of a first frequency with a tone signal of a second frequency, wherein the upper sideband signal has a frequency equal to the sum of the first and second frequencies, and the lower sideband signal has a frequency equal to the difference of the first and second frequencies, the system comprising means for processing the received signal to produce a measurement signal containing the phase information of the received signal at a measurement frequency;

means for providing a local signal at the measurement frequency; and means for subtracting the phase of the measurement signal from the phase of the local signal to produce a phase shift information signal for sequentially indicating the phase shift in the upper and lower sidebands of the received signal.

11. A ranging method, comprising a first method for producing a modulation tone ranging signal for transmission comprising the following steps:

providing a carrier signal of a first frequency;

providing a tone signal of a second frequency;

mixing the carrier signal with the tone signal to produce an upper sideband signal at a frequency equal to the sum of the first and second frequencies and to produce a lower sideband signal at a frequency equal to the difference of the upper and lower frequencies; and separately and sequentially providing the upper and lower sideband signals to produce a sequentially balanced modulation tone ranging signal for transmission; and a second method for producing a phase shift information signal from a received said sequentially balanced modulation tone ranging signal, comprising the following steps:

processing the received signal to produce a measurement signal containing the phase information of the received signal at a measurement frequency;

providing a local signal at the measurement frequency; and subtracting the phase of the measurement signal from the phase of the local signal to produce a phase shift information signal for sequentially indicating the phase shift in the upper and lower sidebands of the received signal.

12. A method according to claim 11, further comprising
providing a data signal; and
phase modulating the carrier signal with the data signal prior to mixing the carrier signal with the tone signal.

13. A method according to claim 11, further comprising
providing a data signal; and
phase modulating the tone signal with the data signal prior to mixing the carrier signal with the tone signal.

14. A method according to claim 11, further comprising
providing a first data signal;
providing a second data signal;
phase modulating the carrier signal with the first data signal prior to mixing the carrier signal with the tone signal; and
phase modulating the tone signal with the second data signal prior to mixing the carrier signal with the tone signal.

15. A ranging method, comprising
a first method comprising the following steps:
providing a carrier signal of a first frequency;
providing a tone signal of a second frequency;
mixing the carrier signal with the tone signal to produce an upper sideband signal at a frequency equal to the sum of the first and second frequencies and to produce a lower sideband signal at a frequency equal to the difference of the upper and lower frequencies; and
separately and sequentially providing the upper and lower sideband signals to produce a sequentially balanced modulation tone ranging signal for transmission; and
a second method for producing a phase shift information signal from a received said sequentially balanced modulation tone ranging signal, comprising the following steps:
providing a first local signal at a frequency equal to the difference of an intermediate frequency from the first frequency plus or minus the second frequency with the first and second frequencies being alternately added and subtracted in sequential synchronization with the upper and lower sideband signals respectively;
heterodyning the received signal with the first local signal to produce an intermediate frequency received signal;
providing a second local signal at a frequency equal to the sum of the intermediate frequency plus a measurement frequency;
heterodyning the intermediate frequency received signal with the second local signal to produce a received measurement signal;
providing a third local signal at the measurement frequency; and
subtracting the phase of the received measurement signal from the phase of the third local signal to produce a phase shift information signal for sequentially indicating the phase shift in the upper and lower sidebands of the received signal.

16. A method according to claim 15, further comprising
providing a data signal; and
phase modulating the carrier signal with the data signal prior to mixing the carrier signal with the tone signal.

17. A method according to claim 15, further comprising
providing a data signal; and
phase modulating the tone signal with the data signal prior to mixing the carrier signal with the tone signal.

18. A method according to claim 15, further comprising
providing a first data signal;
providing a second data signal;
phase modulating the carrier signal with the first data signal prior to mixing the carrier signal with the tone signal; and
phase modulating the tone signal with the second data signal prior to mixing the carrier signal with the tone signal.

19. A method for producing a phase shift information signal from a received sequentially balanced modulation tone ranging signal that contains sequentially separated upper and lower sideband signals produced by mixing a carrier signal of a first frequency with a tone signal of a second frequency wherein the upper sideband signal has a frequency equal to the sum of the first and second frequencies, and the lower sideband signal has a frequency equal to the difference of the first and second frequencies, the method comprising the following steps:
providing a first local signal at a frequency equal to the difference of an intermediate frequency from the first frequency plus or minus the second frequency with the first and second frequencies being alternately added and subtracted in sequential synchronization with the upper and lower sideband signals respectively;
heterodyning the received signal with the first local signal to produce an intermediate frequency received signal;
providing a second local signal at a frequency equal to the sum of the intermediate frequency plus a measurement frequency;
heterodyning the intermediate frequency received signal with the second local signal to produce a received measurement signal;
providing a third local signal at the measurement frequency; and
subtracting the phase of the received measurement signal from the phase of the third local signal to produce a phase shift information signal for sequentially indicating the phase shift in the upper and lower sidebands of the received signal.

20. A method of producing a phase shift information signal from a received sequentially balanced modulation tone ranging signal that contains sequentially separated upper and lower sideband signals produced by mixing a carrier signal of a first frequency with a tone signal of a second frequency, wherein the upper sideband signal has a frequency equal to the sum of the first and second frequencies, and the lower sideband signal has a frequency equal to the difference of the first and second frequencies, the method comprising the following steps:
processing the received signal to produce a measurement signal containing the phase information of the received signal at a measurement frequency;
providing a local signal at the measurement frequency; and
subtracting the phase of the measurement signal from the phase of the local signal to produce a phase shift information signal for sequentially indicating the phase shift in the upper and lower sidebands of the received signal.

* * * * *